United States Patent [19]

Clupper et al.

[11] Patent Number: 4,768,228

[45] Date of Patent: Aug. 30, 1988

[54] DATA ACQUISITION DEVICE

[75] Inventors: Charles B. Clupper, Cameron Park; Robert J. Mathews, Fair Oaks, both of Calif.

[73] Assignee: U.S. Computer Systems, Sacramento, Calif.

[21] Appl. No.: 96,343

[22] Filed: Sep. 11, 1987

Related U.S. Application Data

[63] Continuation of Ser. No. 561,053, Dec. 13, 1983, abandoned.

[51] Int. Cl.<sup>4</sup> ..................... H04N 7/167; H04N 7/04
[52] U.S. Cl. ..................................... 380/20; 380/15; 380/48; 358/147
[58] Field of Search ................... 380/23–25, 380/48, 15; 358/141, 142, 146, 147; 370/84, 91, 99, 100, 108

[56] References Cited

U.S. PATENT DOCUMENTS

| | | | |
|---|---|---|---|
| 4,115,662 | 9/1978 | Guinet et al. | 380/16 |
| 4,301,534 | 11/1981 | Genter | 370/105 |
| 4,420,833 | 12/1983 | Noirel | 358/142 X |
| 4,460,922 | 7/1984 | Ensinger et al. | 380/20 |
| 4,494,142 | 1/1985 | Mistry | 380/20 |
| 4,562,574 | 12/1985 | Kambayashi | 370/100 |

*Primary Examiner*—Stephen C. Buczinski
*Assistant Examiner*—Linda J. Wallace
*Attorney, Agent, or Firm*—Phillips, Moore, Lempio & Finley

[57] ABSTRACT

An apparatus for receiving, detecting and storing a series of discrete bits of data transmitted in conjunction with a video signal wherein only a portion of the transmitted data is read and saved.

18 Claims, 4 Drawing Sheets

DATA ACQUISITION DEVICE

This is a continuation of Ser. No. 561,053, filed Dec. 13, 1983, now abandoned.

BACKGROUND OF THE INVENTION

This invention relates to the reception and acquisition of data transmitted in conjunction with a video signal. In particular, it relates to the detection and acquisition of data transmitted in conjunction with a video signal in a cable television environment wherein the data may, among other things, determine the authorization to a particular television channel associated with the cable transmission.

In the cable television environment, the cable transmitting station generally makes available to the customer a family of programs that are transmitted simultaneously over the cable to the individual customers' television sets. At the individual customer's television set is a cable interface that enables the customer to select the desired channel. The interface or tuner "tunes" the selected cable channel to the customer's television set for display on a commercial television channel. In the United States, a commercial television set is tuned to either channel 3 or channel 4 in the VHF range to receive the cable signal. The channel tuner, therefore, makes available to the television set on either channel 3 or 4 the selected programs transmitted over the cable. Cable television services can simultaneously provide to the user fifty or more channels.

It is common among the cable television systems to provide various tiers of service. Each tier of service may include the lower tiers by adding to the lower tiers one or more additional programs or types of programs. For example, the lowest tier generally includes the local standard channels in the area being covered by the cable service, usually along with a community service channel that provides coverage of the local governing bodies and any other community program considered appropriate.

A higher tier could include an exclusive sports channel while still another tier could include recently released motion pictures. The customer could subscribe to the lowest tier and one or more of the higher tiers at its option. It is to be understood that a change in the level of programming or tier of programming selected usually changes the monthly service charge to the customer.

Recently, cable television systems have started to provide "pay as you view" service for special events such as world championship boxing bouts, and prospectively such events as quadrennial Olympics. It is envisioned that in the near future, first-run motion pictures will be made available to cable television subscribers on a "pay as you view" basis at the time of release. In the "pay as you view" environment, the cable service must have the capability to "turn on" and "turn off" the authorization to view a particular special program. Furthermore, the cable television service should have the capability to change the tier level of a particular customer at will. Finally, for those customers that fail to keep their payments current, the cable service should have the capability to "turn off" the service to that particular set. In the crudest sense, this capability can be provided by sending a technician to the individual's home to (1) authorize a special showing; (2) change the tier level of the channel tuner; or (3) disconnect the cable from the television set.

On the other hand, the subscriber, in receiving the cable signal, would very much like to be able to request a particular special event or tier level up to the time of transmission of the event. Similarly, the customer, in the event he or she is prevented from seeing the show or special event, would very much like to cancel the requested authorization up to the last minute in order to save the "pay as you view" charge.

Since each television cable system supplies a vast number of users (for example, 10,000), it is incumbent upon the individual cable system to be able to communicate with the channel tuner and associated circuitry to "turn on" and "turn off" special events and set tier levels from the head end or transmitting station. Generally, this may be accomplished by separate channels or by rather slow serialized data transmission tuned to the reception rate of the unit controlling the individual television set. The result is the user may not be able to obtain authorization for a special program at the last moment. Further, if authorization is obtained on a particular channel, the user may be able to immediately disconnect the tuner following the special event so that the authorization remains in effect until the next special event is scheduled. This is possible because the deauthorization signal, which must also be transmitted over the cable system, may not come at a sufficiently close interval to ensure the user only obtains access to one special event or does not extend authorization for a particular tier level beyond that which has been paid for.

The principal reason for the slowness of data reception is that cable systems have been required to transmit individual messages to the various users in a serial fashion. Thus, the message to user 1 is immediately followed by the message to user 2 until all of the messages have been sent out to the various users among the 10,000 plus cable customers. Furthermore, if the data transmission rate is too fast for the microprocessors located in the home unit, the data may simply not be received. In order to overcome this, cable data systems must slow the data transmission rate to be compatible to the more reasonably-priced microprocessors. In slowing down the data transmission rate, the repetition rate for the authorization signal and the deauthorization signals is markedly reduced. While slowing down the authorization rate has no immediate adverse affect on the cable system other than customer dissatisfaction because of failure to obtain authorization, slowing down of the deauthorization repetition rate may result in lost revenues when customers are able to tune in on two or more special events after having ordered and paid for only one.

The capability to transmit data at a relatively high rate over a cable system would permit a cable system to provide other services to the user, such as video games, billing information, or to display coming events. For example, in order to play a video game, the customer would "order up" the video game to be played on the home television set by telephone or on a keyboard associated with the cable tuner. The game, once authorization had been received, would be transmitted to the home video set and would be available for play for a specified period of time, such as one-half hour or one hour, at which time authorization would cease and the game would be stricken from the customer's microprocessor memory. Existing cable television systems do not have the capability to transmit the game program in a sufficiently short time to make such an operation feasible.

In addition to "pay as you view" authorization and the video game capability, existing systems do not permit the transmission of "real time advertisements" for overlay on a video picture. For example, if a cable system has programmed a special event such as a world boxing championship bout for the following night, it would be appropriate to announce to the viewers that access to this bout may be obtained by dialing the cable television system and asking for the authorization to watch such a bout. Such advertisement would be provided to the subscribers or customers by means of a data channel directed to each and every cable subscriber for overlay on the television set while the television set is tuned to one of the normal programs made available by the television system.

SUMMARY OF THE INVENTION

It is the object of this invention to provide for an apparatus that meets all the shortcomings set forth above.

In particular, the preferred embodiment of the invention is a data reception apparatus for use with a video transmitter that transmits frames of video signals. The video transmitter also transmits a plurality of successive data patterns, each pattern including a synchronizing signal followed by a plurality of data signals, the patterns being transmitted during the vertical blanking interval of each video frame. The apparatus includes means for receiving the transmitted signal and detection means for detecting the synchronizing signal. Means are also provided for detecting at least one data signal following the detection of the synchronizing signal. Finally, means are included for storing the at least one data signal.

This invention, by selectively detecting only a portion of the transmitted data, permits the use of a relatively slow speed microprocessor in conjunction with a relatively high speed data transmission rate, thus overcoming the problems associated with existing data transmission apparatus that require either a high cost, high speed computer system, or a low speed serialized data transmission system.

DRAWINGS

DETAILED DESCRIPTION OF THE PREFERRED EMBODIMENT

Figure 1:
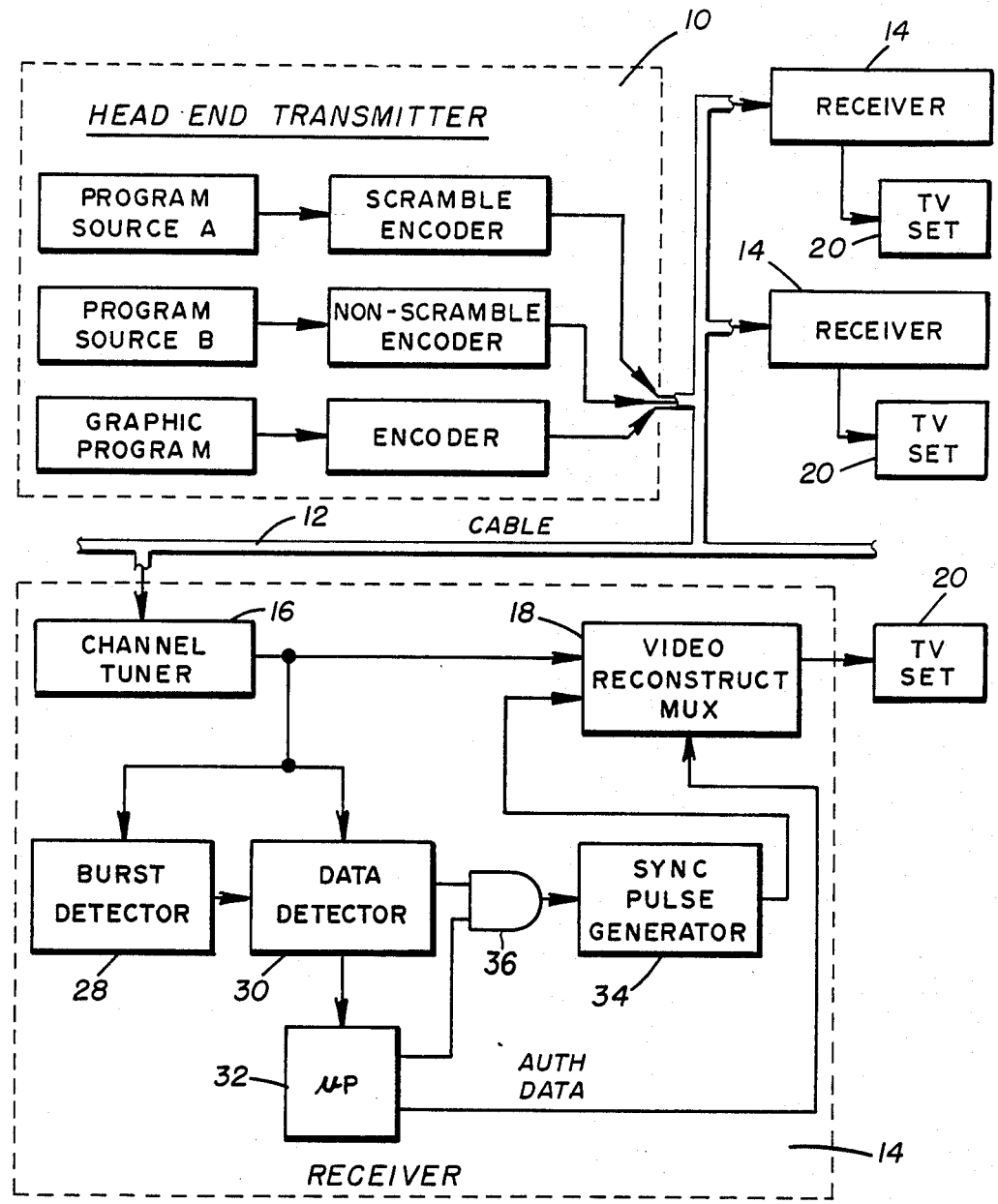
FIG. 1 illustrates the preferred embodiment of this invention in a block diagram.

Referring to FIG. 1, the block diagram contained in the dashed block 10 constitutes the elements contained at the "head end" or transmitter of a video cable system. Specifically, a video cable system makes available to its customers a series of programs as illustrated in block 10 as "program source A," "program source B," and so on, including a "graphic" program. Each of these programs is encoded or prepared for transmission over a cable 12 for reception by tuners or receivers 14 located in subscribers' residences or places of business.

It is pointed out that at the head end 10, particular programs may only be encoded or prepared for transmission over the cable so that the receiver 14 may be tuned through channel tuner 16 to the desired program, where it is amplified and reconstructed as necessary in the multiplexer-amplifier 18 for subsequent delivery to the customers' television set 20 on either standard channel 3 or 4.

On the other hand, the particular program may be a special event for which the cable system wishes to charge a one-time or "pay as you view" fee, in which case the program may be scrambled or encrypted so that an individual customer cannot receive an intelligible signal through the channel tuner without further authorization. Such scrambling may be done in various modes, none of which are the subject matter of this invention. However, suffice it to say one method may mask out the vertical synchronizing pulses and equalizing pulses in the vertical blanking interval of each frame of the transmitted scrambled program. In so doing, the signal received at television set 20 will be unintelligible to the viewer, since the television set is completely dependent on a vertical synchronization pulse at the beginning of each video frame to return the screen to its starting position at the top of the cathode ray tube. A device for accomplishing this type of unscrambling is described in U.S. Pat. No. 4,614,970, issued Sept. 30, 1986 filed concurrently with this application and assigned to the same assignee. This application is incorporated into this specification by reference.

Thus, in head end transmitter 10 a particular program such as a special event may be scrambled and encoded for reception of a channel tuner.

Finally, head end transmitter 10 may also include the capability to transmit a graphic type program such as a video game or the like, which in and of itself would be encoded and possibly scrambled for transmission on cable 12.

Figure 2A:
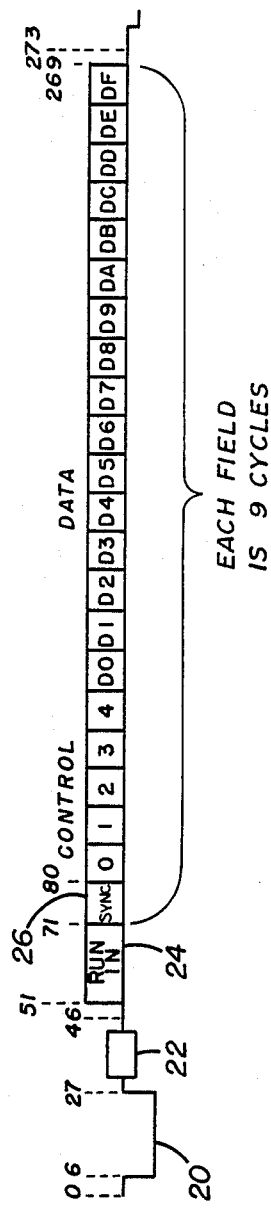
FIG. 2A illustrates the data flow in one line of a video signal in the vertical blanking interval of a standard video frame.
Figure 2B:
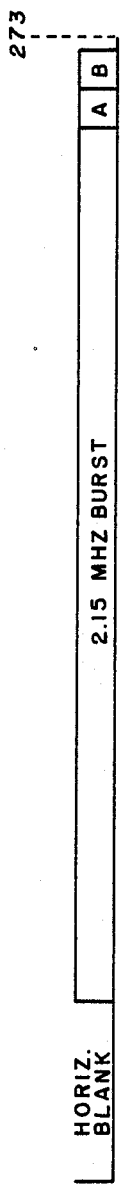
FIG. 2B illustrates the signal burst utilized during the vertical blanking interval to indicate the data transmission as shown in FIG. 2A is to follow.
Figure 2C:
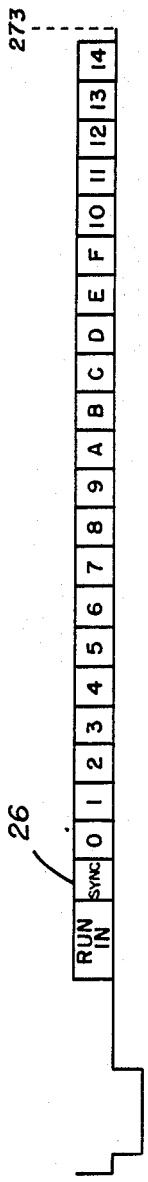
FIG. 2C illustrates the data structure utilized during the active video phase of a video frame when graphic data is being transmitted over a cable data system.

Referring now to FIGS. 2A, 2B and 2C, the preferred method for the transmission of data patterns is illustrated. Each of FIGS. 2A, 2B and 2C illustrate one "line" of a standard video signal in a frame. It should be remembered that each video frame containing 525 lines includes two fields (each of 1/60 second, or 16,667 microseconds duration) with the cathode ray tube being swept twice (once for each field) by the electron beam during each frame. Each time the beam is returned to the top of the cathode ray tube at the end of a field, a period of time equal to 21 lines (1,333 microseconds) is reserved for the vertical blanking interval or "VBI." In the normal unscrambled mode, the first nine lines in the VBI include vertical synchronization pulses with the last twelve lines, or lines 10 through 21, containing only a horizontal synchronization pulse located within the first 10.2 microseconds of that line. It should be pointed out that the sweep of one line takes 63.5 microseconds.

FIG. 2A is a data pattern which, in an unscrambled mode, would occur at or between lines 11 and lines 21 and may be repeated for up to the eleven lines. Each data pattern is shown as being equal in time of transmission to one line or 63.5 microseconds. In the preferred embodiment, the preferred clock cycle associated with the data transmission envisioned herein is based on a 2.15 Mhz frequency providing 273 clock pulses for a one line sweep. As can be seen in FIG. 2A, the normal horizontal synchronization pulse 20 occurs between the sixth and twenty-seventh clock pulse on each of lines 11 through 21. Between clock pulse 27 and clock pulse 46 is the standard color burst 22, which provides color synchronization for the individual television set. Next in this data pattern is a clock "run-in" 24 taking 20 clock pulses and beginning at clock pulse 51 and running through clock pulse 71.

At clock pulse 71, a synchronizing pulse is transmitted from the head end transmitter lasting for nine pulses. This synchronizing pulse 26 can serve a dual purpose in that the nine clock pulses provided can be encoded with discrete bits indicating the type of data line that may follow. For example, synchronizing pulse 26 may be encoded with one particular coding scheme indicating that the succeeding 21 data fields each containing nine clock cycles contain data. On the other hand, synchronizing pulse 26 may contain an indication that this particular line of data is the last line of data in the vertical blanking interval, be it line 21 or some line before line 21.

Following the synchronizing pulse 26, the line is divided into 21 nine-cycle areas or fields, each of which can be encoded with nine discrete bits of data. In the particular embodiment illustrated, the first five fields are used to indicate the program content of the particular channel being received, while the remaining sixteen data fields can be used to transmit data to receivers 14 as shown in FIG. 1. As will be seen, each receiver is tuned to detect and store only predetermined ones of these sixteen fields.

It is expedient to "forewarn" receiver 14 of the impending receipt of data such as that contained in the line illustrated in FIG. 2A. In order to accomplish this, the one line prior to the eleventh line of a television frame contains a 2.15 Mhz burst starting at clock pulse 46 of a particular line or 10.7 microseconds after the beginning of the line and lasting for 48.6 microseconds. It has also been found expedient to synchronize the receiver by the transmission of two data synchronization signals A and B as shown in FIG. 2B, immediately following the 2.15 Mhz burst. Each signal is nine clock pulses long, with the two lasting 4.19 microseconds. Each of these signals may be appropriately coded to indicate the nature of the data contained in the following line, as shown in FIG. 2A. While not important to this particular invention, a third nine-clock-pulse field may be added to the line illustrated in FIG. 2B for use in descrambling a scrambled signal transmitted from the head end transmitter. Such use is described in U.S. Pat. No. 4,614,970, issued Sept. 30, 1986.

In the scrambled case, the horizontal and vertical sync pulses are blank. A descramble signal, the third nine-clock pulse signal mentioned above is randomly placed in the frame. The descrambler detects the coding of the descramble signal and after a length of time corresponding to the coding, generates a full frame sequence of horizontal and vertical sync pulses starting at the preselected point in the frame.

Finally, FIG. 2C illustrates a single line of graphic data transmitted from head end transmitter down cable 12 to receivers 14. As can be seen in FIG. 2C, 21 fields of nine cycles each follow the same twenty-clock-pulse run in time and a nine-clock-pulse synchronization period 26. Here again, the synchronization pulse in the graphic channel illustrated in FIG. 2C may contain nine bits of intelligent information which may be utilized to indicate the nature of the graphic signal, and again only selected data fields are detected and stored.

It should be understood that the division of a line into 273 clock pulses has been used in one embodiment. However, other divisions may be used and longer periods than one line may be used for each data pattern. It has been found that the noted dimensions or positions give a workable data transmission and acceptance apparatus.

Referring again to FIG. 1, it can been seen that the signal emanating from the head end transmitter 10 is received in receiver 14 at channel tuner 16, where burst detector 28 is tuned to receive the 2.15 Mhz burst shown in FIG. 2B and thus, commence the data detection that takes place in data detector 30. It should be noted that such detection will take place whether the signal emanating from head end transmitter 10 is scrambled or nonscrambled, since the burst illustrated in FIG. 2B may be positioned coincident with line 10 in the nonscrambled signal or in the vertical blanking interval between lines 1 and 10, in a scrambled signal with intelligence contained at the end of the burst to indicate the location of the vertical synchronization pulses normally located in the first nine lines of vertical blanking interval.

The data detector 30 will provide to the microprocessor 32 at least one of the data fields or signals following the synchronization pulse 26 to the microprocessor 32. Information provided in the data signals may be authorization to unscramble a "pay as you view" program, the tier level authorized to the particular customer, or data for overlay on the video through the video reconstruct multiplex 18. The authorizing signal, or one-time "pay as you view" special programs, or for the tier control, may control the synchronization of pulse generator 34 through an And gate 36 to match the incoming control signal as shown in FIG. 2A with an authorization signal previously received and stored in microprocessor 32.

Figure 3:
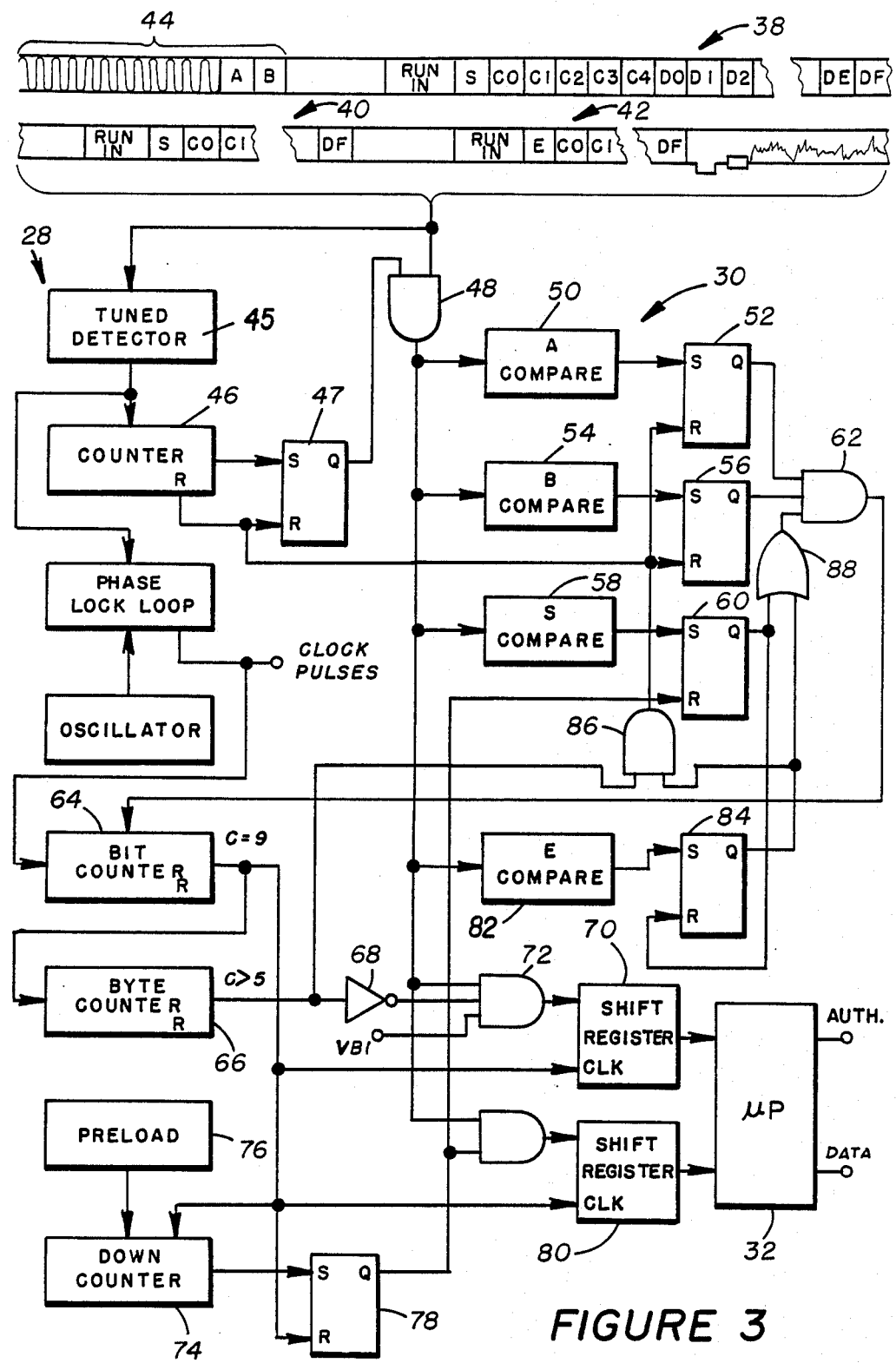
FIG. 3 is a schematic diagram of the selected data reception apparatus described herein for detecting and storing portions of the data contained in the data flow depicted in FIG. 2A.

Referring now to FIG. 3, burst detector 28 and data detector 30 are shown in more detail that that illustrated in FIG. 1. In particular, in FIG. 3, a series of successive data patterns 38, 40 and 42 are shown. The three illustrated data patterns are shown in detail in FIG. 2A, except that horizontal synchronization pulse 20 in a scrambled mode may be eliminated. In this scrambled mode, the horizontal synchronization pulse 20 would be generated by the synchronization pulse generator 34 shown in FIG. 1 only after authorization, and added to the incoming video signal at the appropriate place and time in the video reconstruct multiplexer 18.

Prior to data line 38, the 2.15 Mhz burst shown in FIG. 2B and illustrated in FIG. 3 as signal 44 alerts the data detector to the impending receipt of data.

These sequential signals, starting with the 2.15 Mhz burst followed by the two nine-clock-pulse signals A and B and sequentially by data patterns 38, 40 and 42, are serially received by the tuned detector 44. Tuned detector 45 acts in conjunction with a phase lock loop, itself driven by an oscillator, to produce clock pulses utilized in the invention. As previously noted, the clock operates at a 2.15 Mhz frequency, which results in 273 clock pulses per line in each video frame.

A counter 46 is preloaded so that it will go high after a predetermined period of time that the tuned detector has received a 2.15 Mhz burst. The result of this high signal is that And gate 48 goes high with each data pulse and thus passes the signals being received from head end transmitter 10 through to the various comparators shown in FIG. 3. Initially, the presence of the signal A is determined by comparator 50 to set a flip-flop 52. A second comparator 54 checks for the presence of the B signal to set a flip-flop 56. (Signals A and B are each capable of containing nine bits of information.) At this point the apparatus is in readiness for a synchronization pulse S which occurs in each of the succeeding plurality of data patterns except for the last data pattern in the vertical blanking interval, which may include a synchronizing signal E to indicate the end of data flow for that frame or field and to initiate the resetting of flip-flops 52 and 56. When comparator 58 detects the presence of the synchronization signal S, flip-flop 60 is set so that the high signals received from flip-flops 52, 56 and 60 and anded together through And gate 62 to produce a signal to start a bit counter 64. Bit counter 64 itself produces a signal on every ninth clock pulse to assist in distinguishing each of the subsequent control and data fields that are in themselves of nine clock pulses in duration and which may contain nine bits of discrete data. Bit counter 64 provides a pulse as indicated above on every ninth clock pulse to a byte counter 66 which, in this embodiment, produces a high signal at the end of the fifth byte so that the five control signals indicated in FIG. 2A may be detected and stored. Storage may be accomplished by providing the high signal from byte counter 66 to an inverter 68 so that bytes C0 through C4 (see FIG. 3) are collected in shift register 70 through And gate 72 and clocked into microprocessor 32 on each ninth clock pulse. Should only selected data fields be desired, such as fields C1 and C4; appropriate circuitry can be added to the logic shown in FIG. 3. It should be remembered that the control field data in this embodiment contains identifying information for the program being transmitted over the cable.

At the same time byte counter 66 is counting the bytes, a down counter 74, which has been preloaded with a predetermined number from preload 76 and which shifts down one count on each signal received from bit counter 64 counts the data signals (D0, D1, etc.) as they are received in receiver 10 until the predetermined and desired nine bit data signal based on the preloaded number in preload 76 is received. At this time, a flip-flop 78 is set and shift register 80 receives the next nine bits contained in the entire data field. As the ninth bit is received, bit counter 64 goes high, thus clocking the preceding nine bits into microprocessor 32.

It has been found expedient to load the last number of the serial number of each individual receiver into preload 76, thus in any one 273 clock pulses in one line of a video transmission, each receiver will only store in microprocessor 32 only the one data field that corresponds to the last number of the serial number of the receiver. This reduces the data being fed to microprocessor 32 from about 4.5 megabits per second to about 150 kilobits per second, thus reducing the requirement for the very high speed microprocessor with consequent high cost.

When flip-flop 78 is set, flip-flop 60 is reset in preparation for the next line or data pattern. As can be seen in FIG. 3, data will continue to be received sequentially from each line in the vertical blanking interval until an E compare occurs. The E signal indicates the end of data in the vertical blanking interval and is shown in line 42 of FIG. 3. When the E signal is detected in comparator 82, flip-flop 84 is set so that the output of flip-flop 84 may be anded at And gate 86 with the output of byte counter 66 to reset flip-flops 52 and 56. Flip-flop 60, as noted, is reset by the output of flip-flop 78 so that bit counter 64 is restarted for each plurality of data signals 38 and 40. With the plurality of data signals 42 (that include the E or end of data signal), bit counter 64 is started by the anding of the A and B compare and the E compare through an And gate 62. Thus, bit counter 64 is started by anding the output of flip-flops 52 and 56 with the output of flip-flop 60 or flip-flop 84 at Or gate 88 and And gate 62.

It should be noted that the control data that is clocked into the microprocessor 32 by shift registers 70 may not occur except during the vertical blanking interval so the vertical blanking interval or VBI signal may be anded with the inverted output of byte counter 66 and the data coming through And gate 48 at And gate 72.

Figure 4:
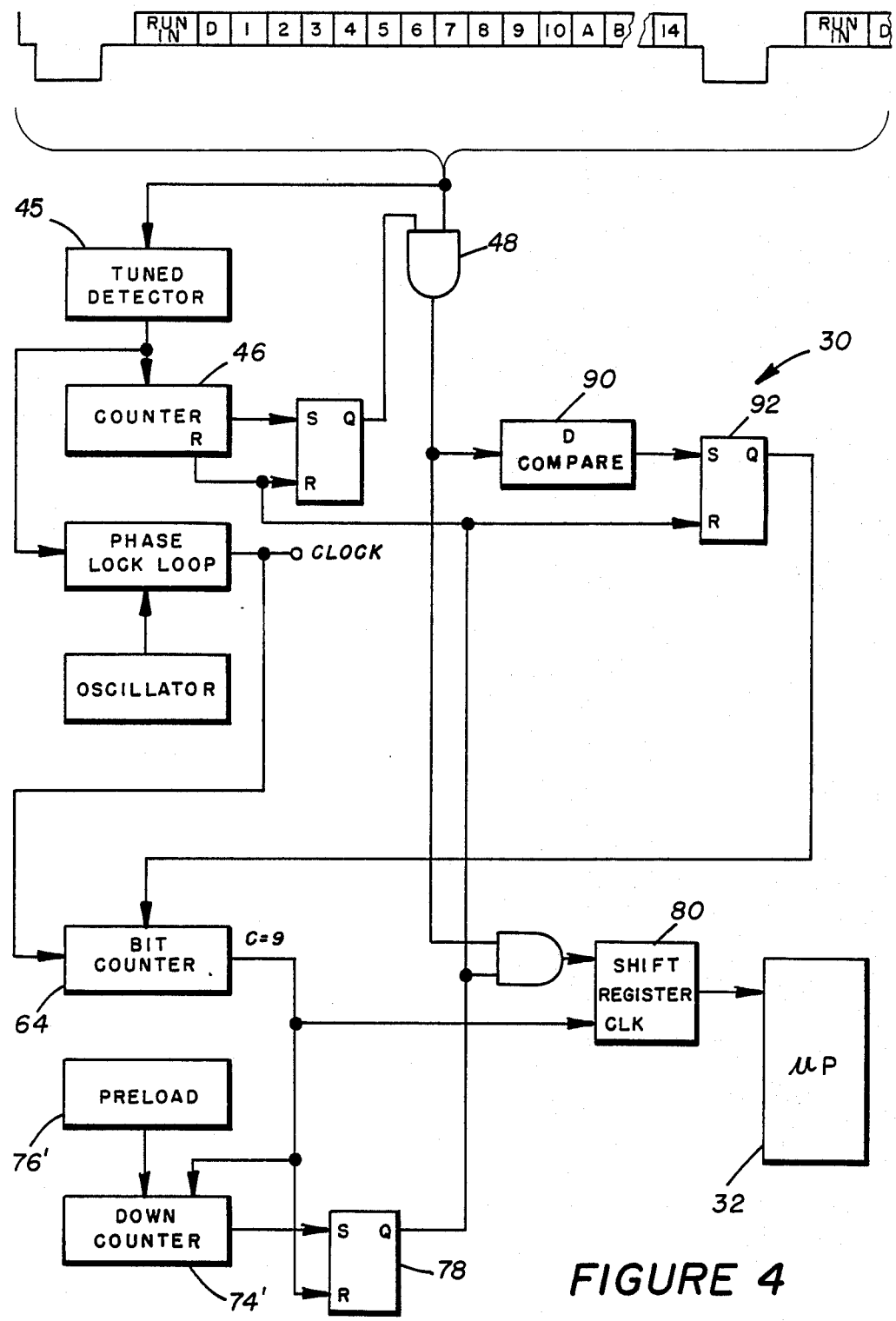
FIG. 4 is a schematic diagram of the data reception apparatus described herein for detecting and storing selected portions of the data flow depicted in FIG. 2C.

Referring now to FIG. 4, a graphic type channel as indicated in FIG. 2C is illustrated in relation to the tuned detector 45 and the data detector 30. The logic shown in FIG. 4 is quite similar to the logic shown in FIG. 3 and may use most of the same circuitry. The "run-in" is sensed in the lines or data patterns contained in the vertical blanking interval and as described above, so that data received in the receiver may pass through And gate 48 to comparator 90 which will set flip-flop 92 upon compare, that, in turn, starts bit counter 64. If the data to be received is located in the same relative position as the data previously received in the vertical blanking interval, then preload 76 may be utilized along with down counter 74. In FIG. 4, preload 76' has been indicated as an alternate preload since a different data field may be selected in the graphic channels, and thus a different preload would be entered into down counter 74. Here again, the down counter will set flip-flop 78, when the predetermined data field is reached. The high signal from flip-flop 78 starts the data stream into shift register 80. Shift register 80 is clocked by the signal from bit counter 64 so that the particular data field in the graphic channel is transferred to microprocessor 32 for appropriate use in the receiver.

OPERATION OF THE PREFERRED EMBODIMENT

It should be apparent to those skilled in the art how this apparatus should work from the description set forth above. However, for clarity's sake, the following is offered.

As previously noted, each program channel contains a vertical blanking interval in the first 21 lines of each 525 lines of the video frame. Twelve of these lines are generally not utilized and in these twelve lines, the data may be transmitted in the forms shown in FIGS. 2A. Preceding the data, a 2.15 Mhz burst may be imposed for various purposes. It should be noted that this 2.15 Mhz burst running for almost a complete line is not necessary to this invention. However, it may become important in other applications, particularly when a signal is scrambled. When a data pattern is to be received and stored, the clock pulses which are indicated in FIG. 2A as occurring between clock pulse 51 and 71 and labelled Run-In 24 are detected by the tuned detector 45 and for the period indicated in counter 46 so that flip-flop 47 is set to permit data to pass to the various comparators shown in FIG. 3.

While the 2.15 Mhz burst shown in FIG. 2B is not necessary for an unscrambled signal, it may be necessary for the scrambled signal, hence the A and B comparators are included. In the unscrambled situation, the A and B comparators may be eliminated and the S comparator, sensing the nine-clock-pulse synchronization signal, need be the only comparator to start the detection of data signals within the individual patterns. When the S comparator has determined the presence of the coded signal in the S data area, then flip-flop 60 is set and bit counter 64 is started so that the information contained in the control field, C0 through C4, may be read into the microprocessor through shift register 70. In practice, only one or two of these fields may be read and stored. Concurrent with the starting of bit counter 64, preload 76 has preloaded a particular data field desired to be read into down counter 74 so that when that predetermined data field is reached, flip-flop 78 is set and the data contained in that particular data field is clocked into microprocessor 32 through shift register 80. This sequence is repeated for each successive data pattern until the ending data pattern in the vertical blanking interval is sensed by the E comparator so that bit counter 64 is started through Or gate 88 to permit the same sequence of events previously described for shifting the control fields and the data fields into the microprocessor 32 may occur.

An appropriate sequence of signals would clarify the use of the data acquisition apparatus described herein. For example, assume that the base 16 (hexidecimal) serial number of the particular receiver 14 is 2CD03 and that the user wishes to buy tier 7 on channel 13. Therefore, data field 3 is preloaded into preload 16 and only data field $3_{16}$ is read into microprocessor 32. It should be understood that each data field D0 through DF can contain nine bits of information, or two four-bit groups with one parity bit. This will permit the transmission of two base-16 numbers in each data field. Since only one data field is read through shift register 80 in each line, then each line from 11 through 21 in the vertical blanking interval can contain two base-16 numbers. In practice, four lines are usually used. For example:

|  | VBI1 | | | | VBI2 | | | | VBI3 | | | |
|---|---|---|---|---|---|---|---|---|---|---|---|---|
| Message | AA | AA | AA | AA | FD | FD | XX | XX | 2C | D0 | 07 | 13 |
| Line at | 11 | 12 | 13 | 14 | 11 | 12 | 13 | 14 | 11 | 12 | 13 | 14 |
| Data Field $3_{16}$ | | | | | | | | | | | | |

While this message is illustrative only, it should be pointed out that only lines 11 through 14 have been utilized. The first four groups of AA may be an attention signal and would occur in the first vertical blanking interval in VBI1. The FD's in VBI2 at lines 11 and 12 may be an interrupt to the microprocessor with the data contained in lines 13 and 14 indicating the length of the message. In vertical blanking interval 3, the remaining portion of the serial number of the receiver 14 occurs with 2C in line 11 and D0 in line 12. Of course, it is understood that the $2CD0_{16}$ is combined with the $3_{16}$ that is implied by the position of the data received to reconstruct the serial number in microprocessor 32 as 2CD03. When serial number is reconstructed in the microprocessor, the microprocessor will go ahead and process the signals that follow and ignore any other signals not addressed to the particular receiver. In the particular instance shown, the signal very well could be 07 for tier 7 followed by a 13 in line 14 indicating that tier 7 on channel 13 has been authorized for receiver 2CD03. It should be apparent that, concurrent with this signal coming to receiver 2CD03, fifteen other signals can be sent to fifteen other receivers during the same lines and frames utilized to send this particular message to this particular serial number.

This invention permits a broad scale transmission of differing signals to different sets at the same time without overloading relatively slow microprocessors such as microprocessor 32. Utilizing the low-cost, relatively slow-speed microprocessor 32 reduces the overall cost of the receiver without necessarily degrading the entire system because of the data transmission speed.

It should be understood that this invention is limited only by the scope of the claims.

We claim:

1. A data-acquisition apparatus for use with a video transmitter which transmits frames of video signals, each frame consisting of a plurality of lines, along with a plurality of first successive data patterns each first data pattern fully contained in one of the plurality of lines and including a first synchronizing signal followed by a plurality of first data signals, the first data patterns transmitted only during the vertical blanking interval of each video frame, the apparatus comprising:

means for receiving said transmitted signals;

detection means for detecting the synchronizing signal in each first data pattern;

means for selectively detecting at least one but less than said plurality of first data signals within a first data pattern at a predetermined interval "i" following detection of a synchronizing signal, the interval "i" being less than the interval "I" between each succeeding synchronizing signal;

means for storing at least one data signal.

2. The data acquisition apparatus of claim 1 wherein the means for selectively detecting at least one but less than said plurality of first data signals further includes means for detecting a single data signal from each successive first data pattern, each detected signal data signal starting at a predetermined interval "i" after the detection of the synchronizing signal, the first interval "i" less than the interval "I" between each succeeding first synchronizing signal.

3. The data acquisition apparatus of claim 2 wherein each video frame transmitted by the video transmitter further includes a plurality of second data patterns, each pattern including a second synchronizing signal and plurality of second data signals, said second data patterns transmitted in lieu of video patterns;

the synchronizing signal detection means further including means to identify the second set of data patterns and the means for selectively detecting at least one but less than said plurality of first data signals further including means to selectively detect at least one data signal in each plurality of second data patterns.

4. The data acquisition apparatus of claim 3 wherein the means for selectively detecting less than said plurality of first data signals further includes means for detecting a single second data signal from each successive second data pattern, each detected single second data signal starting at a predetermined interval "j" after the detection of the second synchronizing signal, the first interval "j" less than the interval "J" between each succeeding first synchronizing signal.

5. The data acquisition apparatus of claim 1 wherein each video frame transmitted by the video transmitter further includes a plurality of second data patterns, each pattern including a second synchronizing signal and plurality of second data signals, said second data patterns transmitted in lieu of video patterns;

the synchronizing signal detection means further including means to identify the second set of data patterns and the means for selectively detecting at least one but less than said plurality of first data signals further including means to selectively detect at least one data signal in each plurality of second data patterns.

6. The data acquisition apparatus of claim 1 wherein the means for storing the at least one data signal includes a microprocessor.

7. A data acquisition apparatus for use with a video transmitter which transmits frames of video signals, each frame consisting of a plurality of lines without detectable horizontal and vertical synchronizing pulses and with a descrambler signal which is coded with information indicating the length of time that said descrambler signal precedes a predetermined point in said frame, the video transmitter further transmitting a plurality of successive first data patterns each first data pattern fully contained in one of the plurality of lines and including a first synchronizing signal followed by a plurality of first data signals, the first data patterns transmitted immediately following said variably coded descramble signal, the apparatus comprising:

means for receiving said transmitted signals;
detection means for detecting the synchronizing signal;
means for selectively detecting at least one but less than said plurality of first data signals within a first data pattern at a predetermined interval "i" following the detection of the synchronizing signal, the interval "i" being less than the interval "I" between each succeeding synchronizing signal;
means for storing at least one first data signal.

8. The data acquisition apparatus of claim 7 wherein the means for selectively detecting at least one but less than said plurality of first data signals further includes means for detecting a single data signal from each successive first data pattern, each detected single data signal starting at a predetermined interval "i" less than the interval "I" between each succeeding first synchronizing signals.

9. The data acquisition apparatus of claim 8 wherein each video frame transmitted by the video transmitter further includes a plurality of second data patterns, each pattern including a second synchronizing signal and a plurality of second data signals, said second data patterns transmitted in lieu of video patterns;

the synchronizing signal detection means further including means to identify the second set of data patterns and the means for selectively detecting at least one but less than said plurality of first data signals further including means to selectively detect at least one data signal in each plurality of second data patterns.

10. The data acquisition apparatus of claim 7 wherein each video frame transmitted by the video transmitter further includes a plurality of second data patterns, each pattern including a second synchronizing signal and a plurality of second data signals, said second data patterns transmitted in lieu of video patterns;

the synchronizing signal detection means further including means to identify the second set of data patterns and the means for selectively detecting at least one but less than said plurality of first data signals further including means to selectively detect at least one data signal in each plurality of second data patterns.

11. The data acquisition apparatus of claim 10 wherein the means for selectively detecting least one but less than said plurality of first data signals further includes means for detecting a single second data signal from each successive second data pattern, each detected single second data signal starting at a predetermined interval "j" after the detection of the second synchronizing signal, the first interval "j" less than the interval "J" between each succeeding first synchronizing signals.

12. The data acquisition apparatus of claim 7 wherein the means for storing the at least one data signal includes a microprocessor.

13. A method for detecting and acquiring a data signal transmitted from a video transmitter which transmits frames of video signals, each frame consisting of a plurality of lines, each frame transmitted along with a plurality of successive first data patterns, each first data pattern fully contained in one of the plurality of lines and including a first synchronizing signal followed by a plurality of first data signals, the first data patterns transmitted during the vertical blanking interval of each frame, the method comprising the steps of:

receiving the transmitted video signals;
detecting the presence of the synchronizing signal in each first data pattern;
detecting selectively at least one but less than the plurality of first data signals within a first data pattern at a predetermined interval "i" following the detection of the first synchronizing signal, the interval "i" being less than the interval "I" between each succeeding synchronizing signal;
storing in a micro-processor the detected data signals.

14. The method of claim 13 where the step of selectively detecting at least one but less than said plurality of data signals includes the step of timing the incoming signals for a predetermined length of time following the detection of the synchronizing signal.

15. The method of claim 13 wherein the transmitted video signal includes a second synchronizing signal indicating the presence of a second data pattern followed by a plurality of first data signals, the second synchronizing signal following the plurality of first data patterns, the method including the additional steps of:

detecting the presence of the second synchronizing signal;

selectively detecting at least one data signal following the detection of the second synchronizing signal; and storing in the microprocessor the detected data signal.

16. A method of acquiring data for use in conjunction with a receiver which receives signals from a video transmitter that transmits frames of video signals without detectable horizontal and vertical synchronizing pulses and with a descrambler signal which is coded with information indicating the length of time that said descrambler signal precedes a predetermined point in said frame, the video transmitter further transmitting a plurality of successive first data patterns each first data pattern including a first synchronizing signal followed by a plurality of first data signals, the first patterns transmitted immediately following said variably coded descramble signal, the method comprising:

receiving said transmitted signals;

detecting the synchronizing signal;

detecting selectively at least one but less than the plurality of data signals at a predetermined interval "i" following the detection of the synchronizing signal, the interval "i" being less than the interval "l" between each succeeding synchronizing signal.

17. The method of claim 16 wherein the step of detecting selectively at least one but less than the plurality of data signals further includes the step of detecting a single data signal from each successive first data pattern, each detected single data signal starting at a predetermined interval "i" after the detection of the synchronizing signal, the interval "i" less than the interval "l" between each succeeding first synchronizing signals.

18. The method of claim 17 wherein each video frame transmitted by the video transmitter further includes a plurality of second data patterns, each pattern including a second synchronizing signal and a plurality of second data signals, said second data patterns transmitted in lieu of video patterns, the method including the further steps of:

identifying the second set of data patterns;

selectively detecting at least one data signal from a second data pattern.

* * * * *